(12) United States Patent
Reiser

(10) Patent No.: US 11,511,517 B2
(45) Date of Patent: Nov. 29, 2022

(54) PRINT BOARD CAPABLE OF BEING SEPARATED INTO PIECES AFTER PRINTING THEREON

(71) Applicant: Lamitech, Inc, Cranbury, NJ (US)

(72) Inventor: Adam Reiser, Bordentown, NJ (US)

(73) Assignee: Lamitech, Inc., Cranbury, NJ (US)

( * ) Notice: Subject to any disclaimer, the term of this patent is extended or adjusted under 35 U.S.C. 154(b) by 151 days.

(21) Appl. No.: 17/179,387

(22) Filed: Feb. 18, 2021

(65) Prior Publication Data

US 2021/0252831 A1 Aug. 19, 2021

Related U.S. Application Data

(60) Provisional application No. 62/977,759, filed on Feb. 18, 2020.

(51) Int. Cl.
*B32B 7/06* (2019.01)
*A63F 9/10* (2006.01)
*B42D 15/00* (2006.01)

(52) U.S. Cl.
CPC ............ *B32B 7/06* (2013.01); *A63F 9/10* (2013.01); *B42D 15/0093* (2013.01); *A63F 2009/1072* (2013.01); *B32B 2307/75* (2013.01); *B32B 2559/00* (2013.01)

(58) Field of Classification Search
CPC ... B32B 7/06; B32B 2307/75; B32B 2559/00; A63F 9/10; A63F 2009/1072
USPC ...................................................... 428/32.18
See application file for complete search history.

(56) References Cited

U.S. PATENT DOCUMENTS

| 6,336,631 B1* | 1/2002 | Volkert ............ A63F 9/10 273/157 R |
| 6,425,581 B1* | 7/2002 | Barrett ............ A63F 3/0434 434/153 |
| 2002/0043760 A1* | 4/2002 | Gallant ............ A63F 9/10 273/157 R |
| 2004/0057747 A1* | 3/2004 | Michlin ............ G03G 15/0884 399/106 |
| 2005/0253336 A1* | 11/2005 | Schwartz ............ A63F 9/0613 273/157 R |
| 2006/0261547 A1* | 11/2006 | Uzuanis ............ A63F 9/12 273/157 R |
| 2021/0252831 A1* | 8/2021 | Reiser ............ B32B 29/08 |

* cited by examiner

*Primary Examiner* — Betelhem Shewareged
(74) *Attorney, Agent, or Firm* — Douglas J. Ryder; Ryder, Mazzeo & Konieczny LLC

(57) ABSTRACT

A print board capable of being printed on and then separated into one or more pieces. The print board includes a main layer, a printable layer secured to a first side of the main layer and a pressure sensitive layer secured to a second side of the main layer. The print board is kiss cut through the printable layer, the main layer and a releasable portion of the pressure sensitive layer to form the one or more pieces. A base layer of the pressure sensitive layer holds the one or more pieces together so that personalized projects may be printed thereon. The personalized projects are printed on the printable layer and then the base layer of the pressure sensitive layer is removed. After the base layer is removed the print board is broken into the one or more pieces.

16 Claims, 6 Drawing Sheets

PRINT BOARD CAPABLE OF BEING SEPARATED INTO PIECES AFTER PRINTING THEREON

This application claims the priority under 35 U.S.C. § 119 of Provisional Application Ser. No. 62/977,759, filed on Feb. 18, 2020, entitled "Point of Sale Printing and Creation of Novelty Items Including Prints That Can be Broken Apart (e.g., Puzzles)" and having Adam Reiser as inventor. Application No. 62/977,759 is incorporated herein by reference in its entirety.

BACKGROUND

Creating personalized novelty items (e.g., items having pictures, items having customized language) is a growing trend. The novelty items may include, but are not limited to, stickers, mugs, coasters, calendars, puzzles, posters, or items utilizing rigid boards. Most, if not all, of the novelty items are ordered by a customer either at a store or via the Internet, processed at a remote location (e.g., off-site processing center) and then either mailed directly to the customer or to the store for the customer to pick up. The remote processing may include printing personalized projects (e.g., pictures, images, text) on novelty items that cannot be printed by printers typically available in stores. These novelty items may include three dimensional items (e.g., mugs) or items to thick to be run through the standard photo-type printer (e.g., rigid boards).

Some stores may be equipped with printers capable of printing on rigid boards (e.g., cardboard, card stock, pressed board, chipboard, laminates) having a thickness of over approximately 0.02 inches up to approximately 0.08 inches. For example, Epson, Canon and Fuji make printers capable of printing on rigid boards in this thickness range. Printer models capable of printing on rigid boards in this thickness range include, for example, models 7890 and P6000. Utilizing such printers in stores enables the stores the ability to select and/or design personalized information on the rigid boards without the need for remote processing. However, simply printing the personalized projects on the rigid boards may cause bleeding issues at the edges due to the thickness. To account for the bleeding issues the printing may not be done to the edge of the rigid boards, which leaves the rigid boards with a border that may not be desired.

What is needed is the ability to produce novelty items on rigid boards at the stores, without the items bleeding at the edges or the need for an unnecessary border. Eliminating remote processing to produce rigid board novelty items would drastically decrease the time required to have the novelty items available to the customer which would likely increase purchases (especially last minute purchases) thereof. Furthermore, the availability of the novelty items at the stores would likely result in additional impulse purchases thereof.

BRIEF DESCRIPTION OF DRAWINGS

The features and advantages of the various embodiments will become apparent from the following detailed description in which.

DESCRIPTION

A rigid board that could easily be broken apart at desired locations after it was printed on could provide stores the capability of printing personalized projects (e.g., pictures, images, text) thereon thus creating novelty items to offer customers. For example, if the edges of the rigid boards could be removed after printing, the entire board could be printed on and then the edges were bleeding occurred could be removed. This would provide the ability to provide a print over an entire rigid board without any bleeding issues. If the rigid board could be broken apart into several pieces (e.g., round, square) that matched a configuration for printing images on the rigid board (e.g., 2, 4, 8, 16 per print) then the pictures could be printed on the rigid board and after printing the board could be broken apart to form novelty items (e.g., coasters, badges, signs, pictures). If the board was cut apart in shapes that connected to one another an image could be printer over the entire board and then the image can be split apart to create, for example, a puzzle.

The rigid boards would need to be pre-cut so they could be broken apart after printing while being held together sufficiently to allow for printing thereon. This may require multiple levels of materials to be combined together where the cutting is only through some of the levels of material. After the printing, a layer holding the other layers together may be removed so that the remaining parts can be separated.

Figure 1:
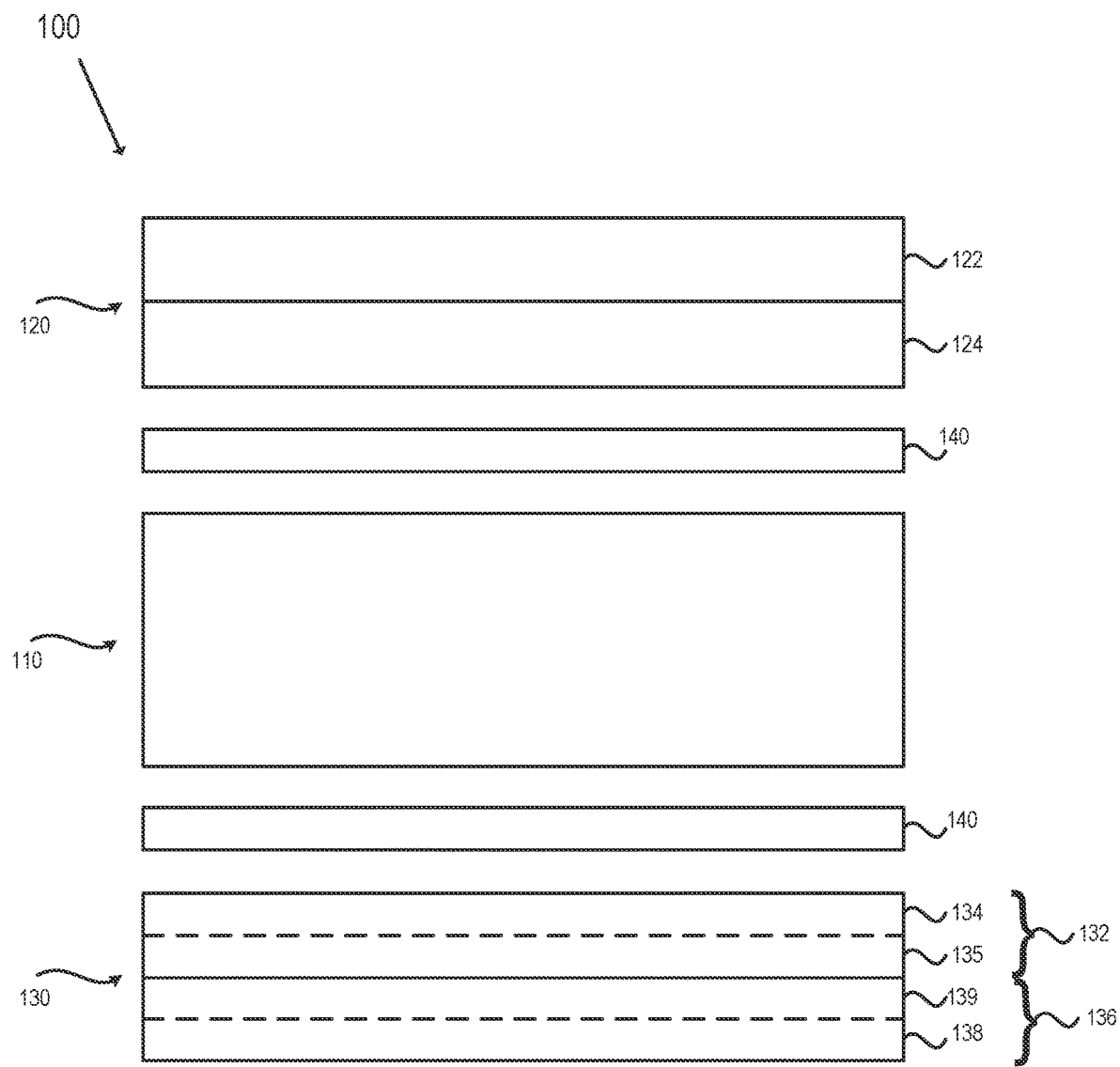
FIG. 1 illustrates a layer diagram of an example print board that may be utilized for in-store printing of personalized projects on rigid boards to create different novelty items, according to one embodiment.

FIG. 1 illustrates a layer diagram of an example print board 100 that may be utilized for in-store printing of personalized projects on rigid boards to create different novelty items. The print board 100 may include a main layer 110, a printable layer 120 and a pressure sensitive layer 130. The main layer 110 is to provide the thickness for the print board 100, the printable layer 120 is for printing the personalized projects thereon, and the pressure sensitive layer 130 is used to hold sections of the print board 100 together, but can be removed to allow the sections to be separated (e.g., after printing). The printable layer 120 may be located on one side of the main layer 110 and the pressure sensitive layer 130 may be located on the opposite side of the main layer 110. A laminating adhesive 140 is used to secure printable layer 120 and the tag layer 130 to appropriate sides of the main layer 110. The adhesive 140 may be a cold polyvinyl acetate (PVA) adhesive.

The main layer 110 may be made of thicker material such as clipboard, cardboard, card stock, pressed board, or the like. The main layer 110 may be made of recycled material. The printable layer 120 may include a printable material 122 (e.g., photo paper) and a liner 124. The liner 124 may be secured to the main layer 110 so the printable material 122 is facing outward and may be available for printing on the first side of the print board 100. The pressure sensitive layer 130 may include a base layer 136 and a releasable layer 132. The base layer 136 may include a liner 138 having an adhesive 139 on one side thereof. The liner 138 may be a film, stock or other materials. The releasable layer 132 may include a liner 134 having a release coat 135 on one side thereof. The liner 138 may be a film, stock or other materials. The adhesive 139 may be secured to the release coat 135 so that the liners 134, 138 face outward on opposite sides of the pressure sensitive layer 130. The liner 134 is secured to the main layer 110 so that the liner 138 faces outward. At an appropriate time, the base layer 136 is removed from the print board 100 so that the releasable layer 132 is an outermost surface thereof and is a non-stick surface. The base layer 136 removed will have a sticky surface due to the adhesive 139 and can be thrown away.

It should be pointed out that pressure sensitive layer 130 utilized in the print board 100, is used in an opposite manner on how these layers are often utilized. Pressure sensitive layers (e.g., 130) are often used for creating stickers. When creating stickers, an outward facing surface of a base layer (e.g., 136) is printed on. The printed base layer can then be peeled off a releasable layer (e.g., 132) such that an adhesive (e.g., 139) remains on the back of the printed base layer and thus creates the sticker which can be secured to another surface. The printed base layer is the usable product and the releasable layer is the throw away item.

The print board 100 may be formed in rolls or large size sheets. After the print board 100 is formed, it may be trimmed to appropriate sizes (e.g., 12 in×16 in, 17 in×23 in). Once the print board 100 is trimmed to the appropriate size, the board 100 may be kiss cut to create an appropriate number of pieces, in defined locations, shapes and sizes. The kiss cutting of the print board 100 may cut through a majority of the board 100 (the printable layer 120, the main layer 110 and the releasable layer 132 of the pressure sensitive layer 130) but not through the base layer 136 thereof.

Figure 2:
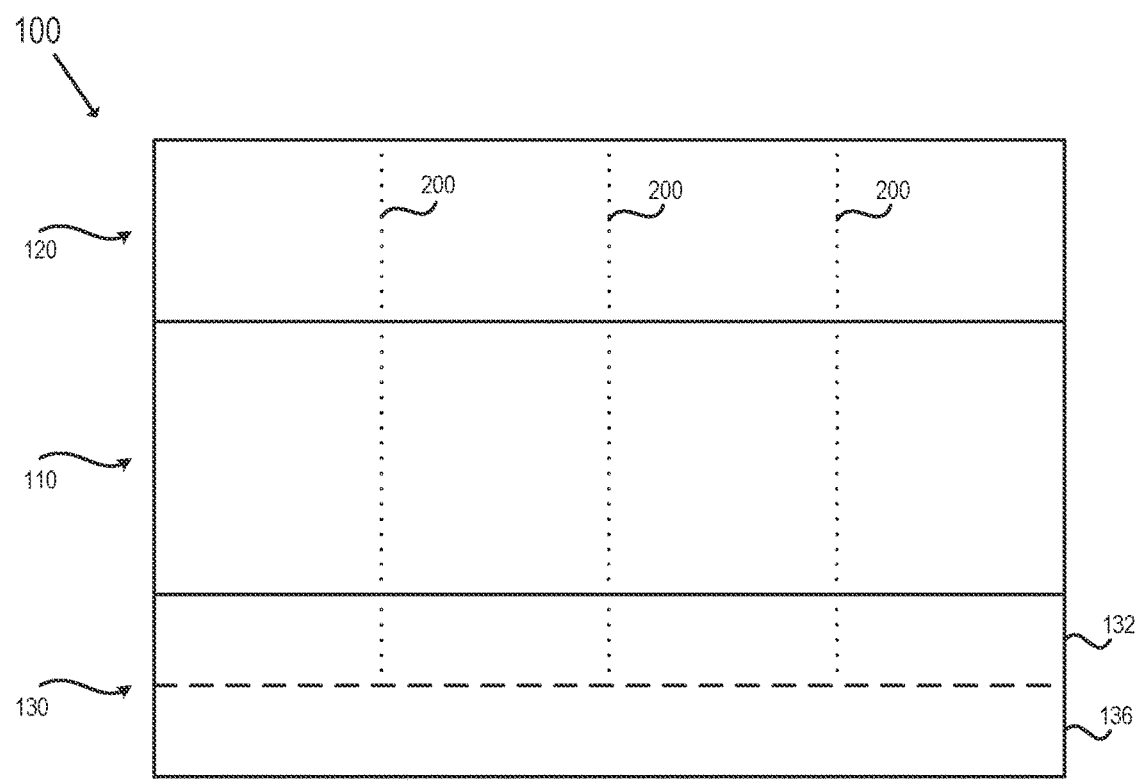
FIG. 2 illustrates a sectional view of an example print board that has several kiss cuts formed therein, according to one embodiment.

FIG. 2 illustrates a sectional view of an example print board 100 that has several kiss cuts 200 formed therein. As illustrated, only the printable layer 120, the main layer 110 and the releasable layer 132 and base layer 136 of the pressure sensitive layer 130 are shown for ease of illustration. The kiss cuts 200 traverse through the printable layer 120, the main layer 110 and partially through the pressure sensitive layer 130 (e.g., through the release layer 132 but not through the base layer 136). As the base layer 136 is not cut, it is a solid piece that is utilized to secure the print board 100 together so that the print board 100 may be printed on. Once the print board 100 is printed on, the base layer 136 may be removed so that the print board 100 can be separated to form the desired pieces. As illustrated, only three kiss cuts 200 are shown evenly spaced out across the width of the print board 100. The number and arrangement of the kiss cuts is not limited thereby and can be any configuration desirable to create the type of novelty items desired.

Figure 3:
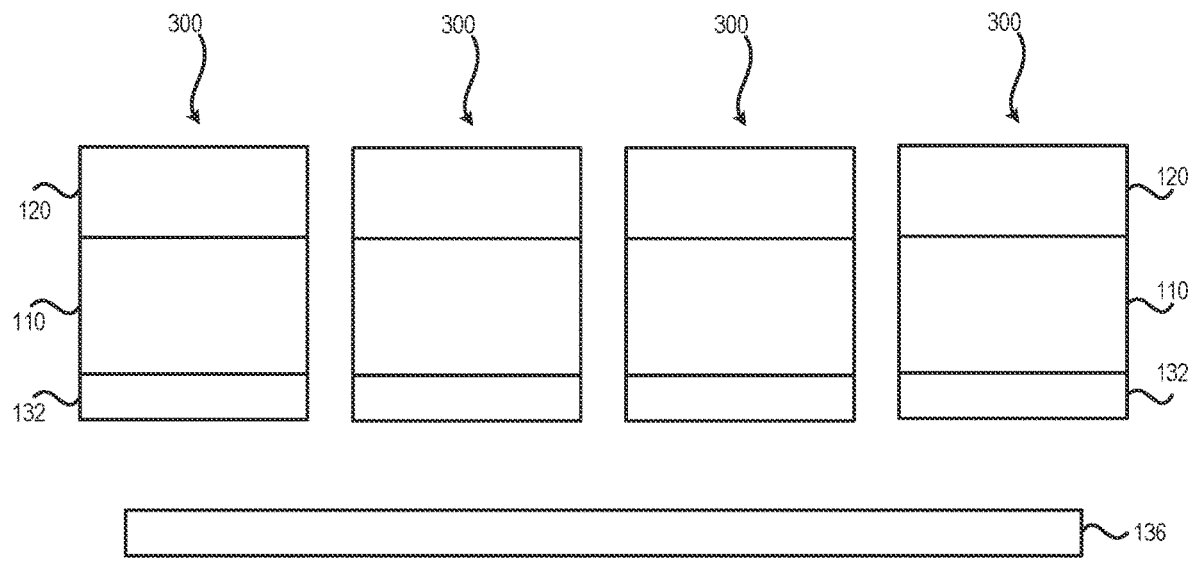
FIG. 3 illustrates a cross sectional view of an example print board after the base layer is removed and the print board is broken into a plurality of pieces, according to one embodiment.

FIG. 3 illustrates a cross sectional view of an example print board 100 after the base layer 136 is removed and the print board 100 is broken into a plurality of pieces 300. As illustrated, the print board is broken into four equally sized pieces 300 based on the three kiss cuts 200 that had been formed therein. The number, size, shape, and arrangement of the kiss cuts and the pieces 300 formed thereby is in no way intended to be limited thereby. Rather any number of pieces 300 may be formed, the pieces may have various shapes and sizes, and the pieces may all be different without departing from the current scope.

Figure 4:
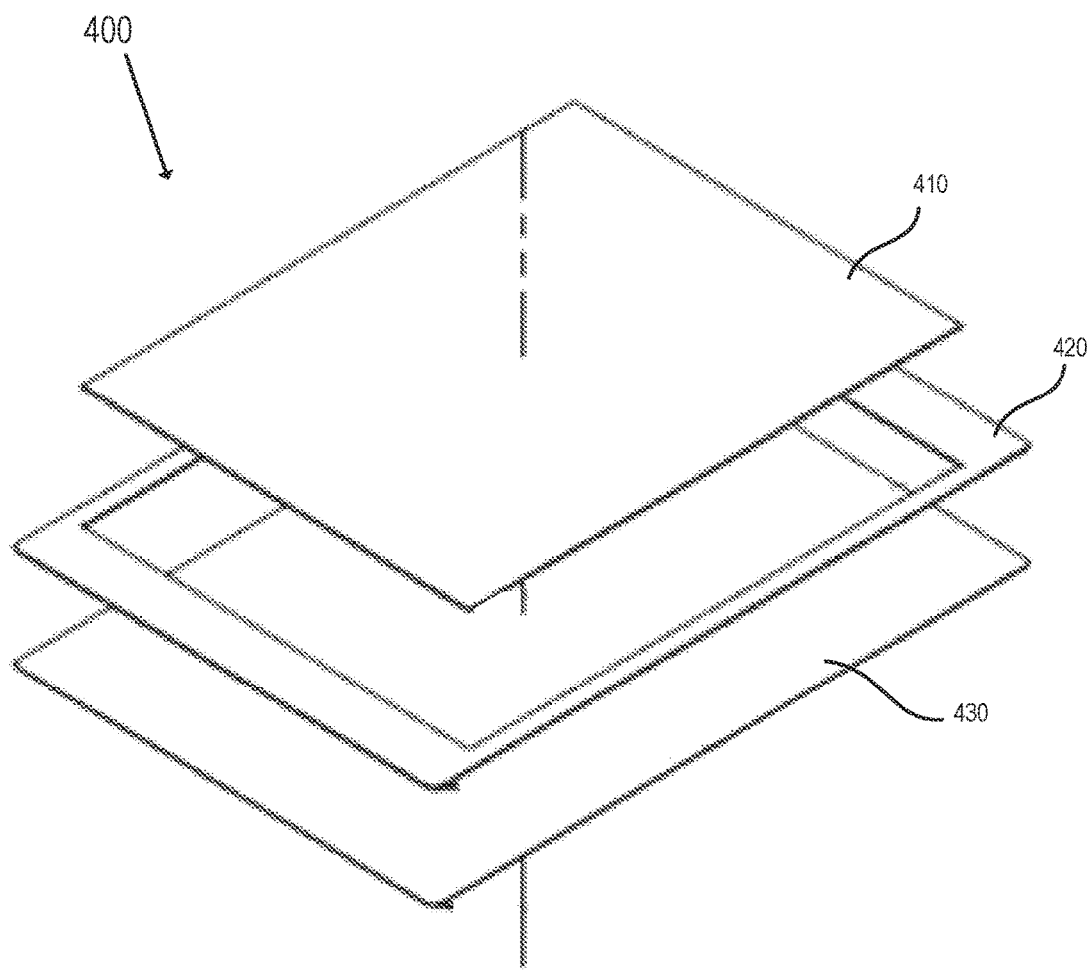
FIG. 4 illustrates an exploded perspective view of an example print board that can be used to print poster boards with clean edges, according to one embodiment.

FIG. 4 illustrates an exploded perspective view of an example print board 400 that can be used to print poster boards with clean edges. The print board 400 may include defined kiss cuts to form a main body 410 and a disposable border 420. A personalized project (e.g., picture, image, text) may be printed over the entire print board 400 (or at least passed the main body 410) and the edges of the personalized project may bleed. After printing, a base layer 430 may be removed therefrom so that the print board 400 can be broken into the main body 410 and the disposable border 420. The disposable border 420 with the bleeding edges can be discarded leaving a main body 410 with a picture printed to the edge thereof with no issues. While not illustrated the printable main body includes the printable layer 120, the main layer 110 and the releasable layer 132 described above. The disposable boarder 420 is illustrated as being around all four sides with the border on two sides being wider that the other two sides but is in no way intended to be limited thereby. Rather, the disposable boarder 420 could vary in size, shape and arrangement without departing the current scope (e.g., border could simply be located on certain sides, size of all borders could be same, size of all borders could be different, borders could be angled or shaped).

Figure 5A:
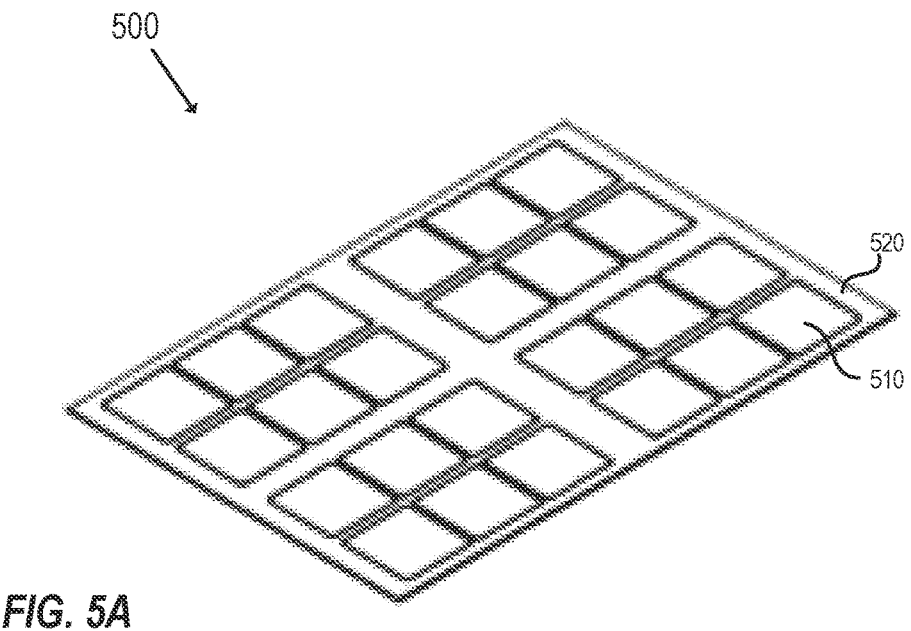
FIGS. 5A-B illustrate a perspective view and an exploded perspective view of an example print board capable of creating a plurality of coasters, tags, badges or the like, according to one embodiment.
Figure 5B:
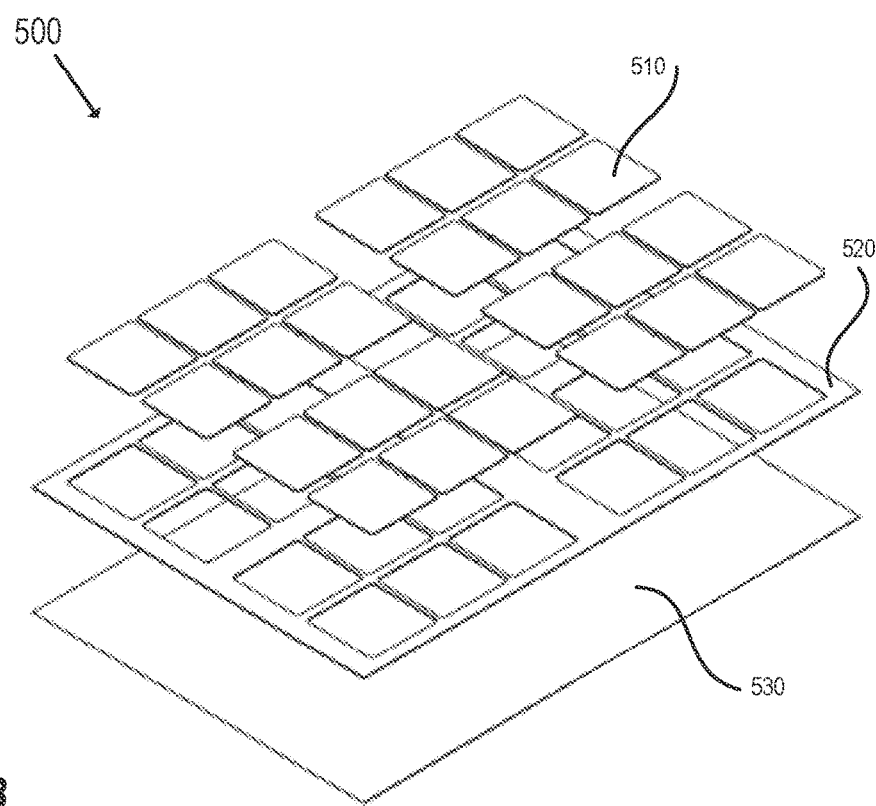

FIGS. 5A-B illustrate a perspective view and an exploded perspective view of an example print board 500 capable of creating a plurality of coasters, tags, badges or the like. The print board 500 is kiss cut so as to form a plurality of squares 510 separated by a disposable border 510. The squares 510 are configured on the board in a manner where personalized project(s) can be printed on those locations or slightly extending past those locations so that bleeding can be removed when broken apart. The printing may be arranged so that the same personalized project is printed on each square. Alternatively, the printing may be arranged so that different squares have different personalized projects printed thereon. Once the printing is done, a base layer 530 may be removed therefrom so that the print board 500 can be broken into individual squares 510 and the disposable border 520.

As illustrated, the board 500 is configured into four sections of six squares each but is in no way intended to be limited thereby. Rather, the number, size and orientation of squares may vary without departing from the current scope as long as the printer is capable of printing in the manner the board is arranged. Furthermore, the individual pieces that are formed are not limited to squares but could be other shapes (e.g., circles, rectangles) without departing from the current scope.

Figure 6:
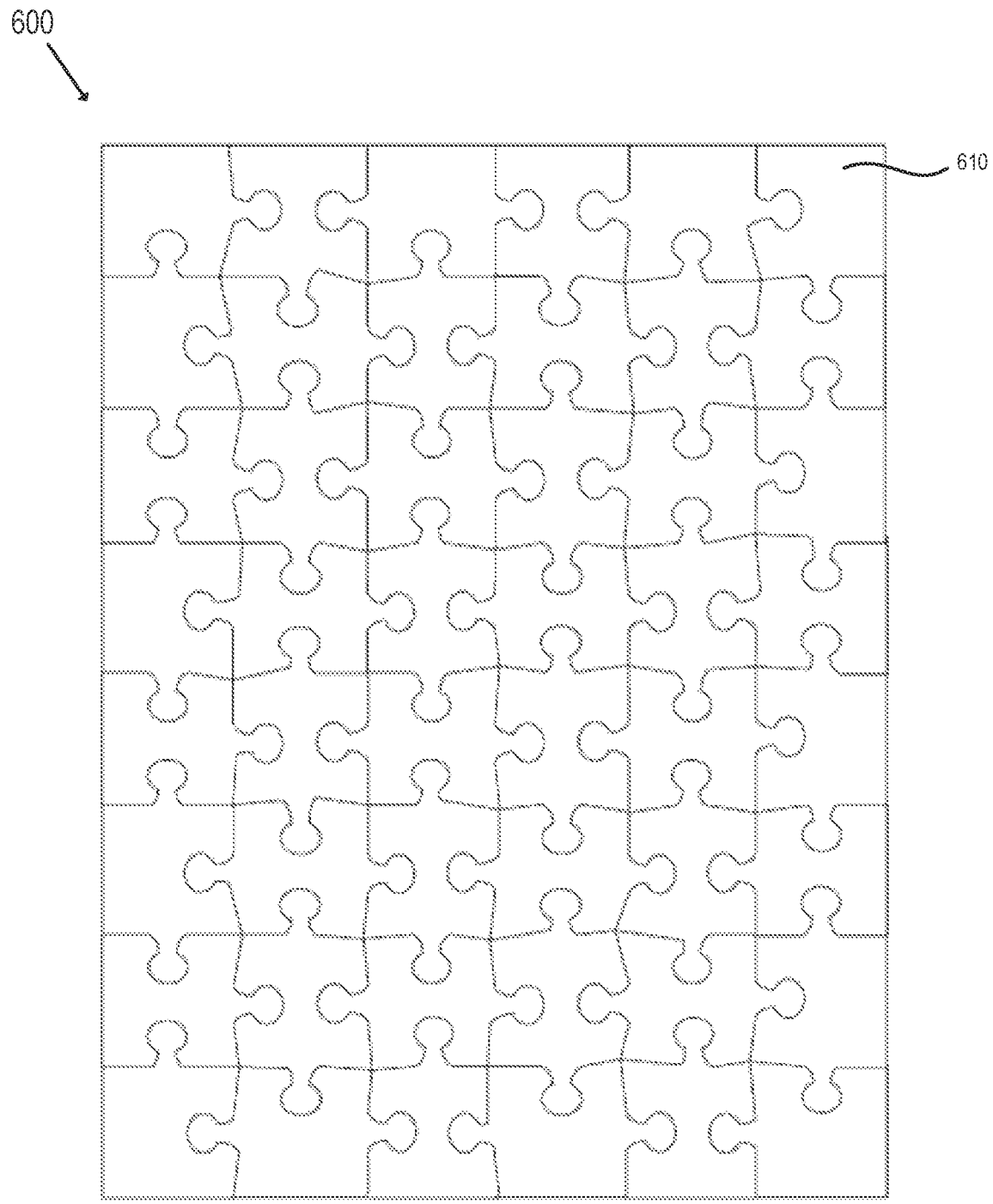
FIG. 6 illustrates a top view of an example print board capable of creating a puzzle, according to one embodiment.

FIG. 6 illustrates a top view of an example print board 600 capable of creating a puzzle. The print board 600 is kiss cut into a plurality of different shaped and interconnected pieces 610 to form a puzzle. A personalized project (e.g., picture) may be printed over the entire print board 600. Once the printing is done, a base layer may be removed therefrom so that the print board 600 can be broken into individual pieces 510 that form the puzzle. The number, shape, size, orientation and arrangement of the pieces may vary without departing the current scope.

Figure 7:
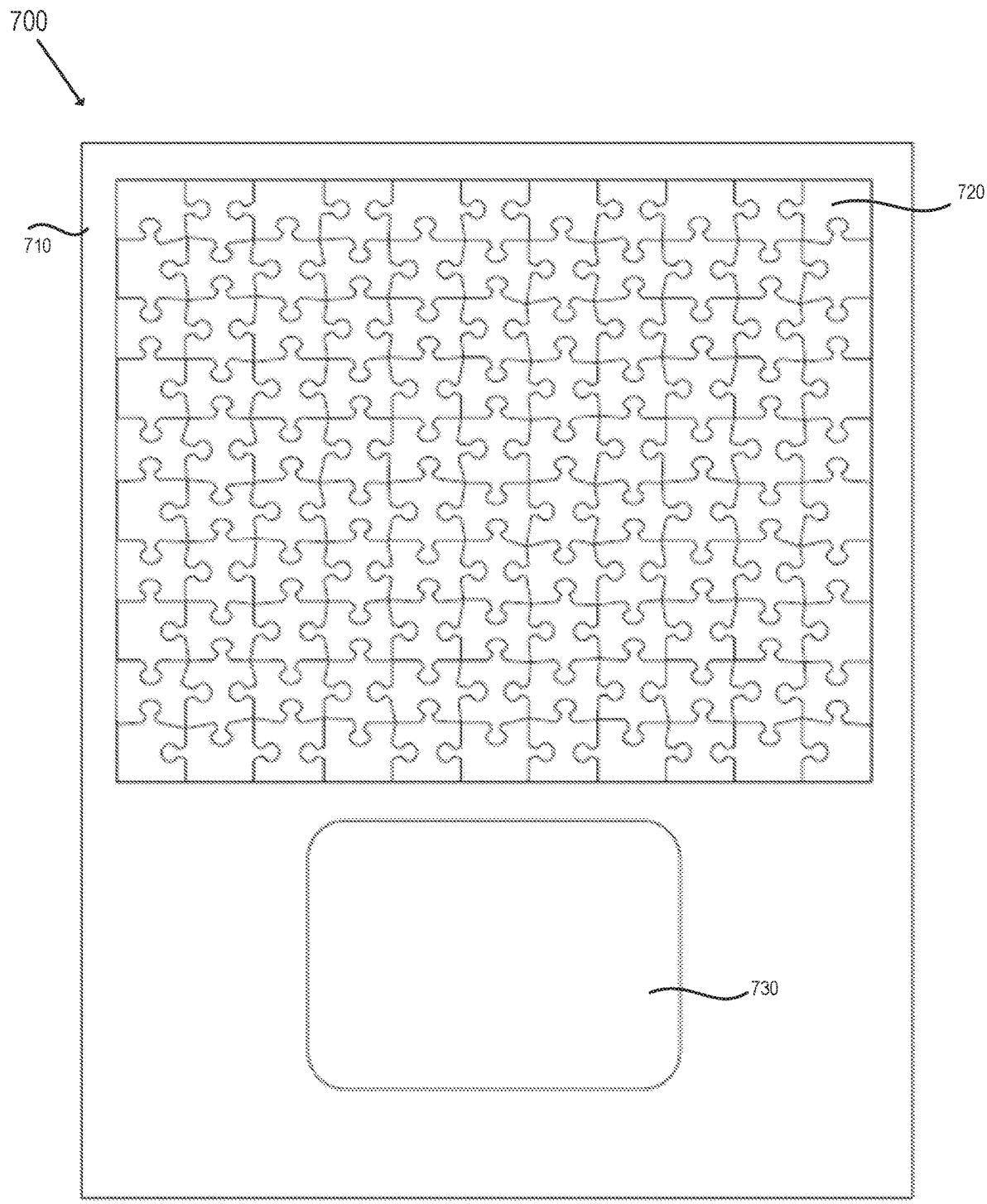
FIG. 7 illustrates a top view of an example print board capable of creating a puzzle with a guide image, according to one embodiment.

FIG. 7 illustrates a top view of an example print board 700 capable of creating a puzzle with a guide image. The print board 700 is kiss cut to form a puzzle 710 having a plurality of different shaped and interconnected pieces 720 on an upper portion thereof and a single piece 730 on a bottom thereof. A personalized project (e.g., picture) may be printed over a portion of the print board 700 aligned with the puzzle 710 (or passed the puzzle 710 so bleeding edges can be removed) and a smaller version of the personalized project may be printed over a portion of the print board 700 aligned with the single piece 730. Once the printing is done, a base layer may be removed therefrom so that the print board can be broken into the pieces 720 that form the puzzle 710 as well as the single smaller piece 730 containing the whole personalized project thereon which can be used as guide for putting the puzzle 710 together. The shape, size, orientation and arrangement of the puzzle 710 with respect to the overall print board 700 may vary without departing from the current scope. The number, shape, size, orientation and arrangement of the pieces 720 may vary without departing the current scope. The shape, size, orientation and arrangement of the smaller piece 730 with respect to the puzzle 710 and the overall print board 700 may also vary without departing from the current scope.

According to one embodiment, the smaller piece 730 may be utilized as a cover for a box that the puzzle pieces 720 may be stored in. According to one embodiment, the smaller piece 730 may be removed without removing the base layer so that the adhesive on the base layer is exposed. A container for holding the pieces may then be secured within the location the smaller piece was removed from and secured thereto by the adhesive. The personalized project from the smaller piece 730 may be secured to the container.

Although the invention has been illustrated by reference to specific embodiments, it will be apparent that the invention is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed is:

1. A print board capable of being printed on and then separated into one or more pieces, the print board comprising:
    a main layer;
    a printable layer secured to a first side of the main layer;
    a pressure sensitive layer secured to a second side of the main layer, wherein the print board is kiss cut through the printable layer, the main layer and partially through the pressure sensitive layer to form the one or more pieces.

2. The print board of claim 1, wherein a personalized project is printed on the printable layer.

3. The print board of claim 2, wherein the personalized project is a picture.

4. The print board of claim 1, wherein the pressure sensitive layer is removed after printing.

5. The print board of claim 4, wherein the print board is broken into the one or more pieces subsequent to the removal of the pressure sensitive material that was holding the one or more pieces together.

6. The print board of claim 1, wherein the one or more pieces includes a main surface and disposable edges to form a borderless poster.

7. The print board of claim 1, wherein the one or more pieces are individual pieces each having a personalized project printed thereon.

8. The print board of claim 1, wherein the one or more pieces are different shaped and interconnected pieces to form a puzzle.

9. The print board of claim 1, wherein the printable layer is photo paper.

10. The print board of claim 1, wherein the main layer is card stock.

11. The print board of claim 1, wherein the pressure sensitive layer includes a releasable layer and a base layer.

12. The print board of claim 11, wherein the base layer is removed so the pieces are separatable.

13. A method for creating a break-apart-able print board, the method comprising:
    obtaining a main layer;
    securing printable layer to a first side of the main layer;
    securing a pressure sensitive layer having a base layer and a releasable layer to a second side of the main layer so that the base layer faces outward;
    kiss cutting through the printable layer, the main layer and the releasable layer of the pressure sensitive layer to form one or more pieces, wherein the base layer of the pressure sensitive layer holds the various layers together.

14. The method of claim 13, further comprising printing a personalized project on the printable layer.

15. The method of claim 14, further comprising removing the base layer of the pressure sensitive layer from the print board.

16. The method of claim 15, further comprising breaking the print board into the one or more pieces.

* * * * *